(12) United States Patent
Dakemoto et al.

(10) Patent No.: US 9,164,799 B2
(45) Date of Patent: Oct. 20, 2015

(54) MULTIPROCESSOR SYSTEM

(75) Inventors: Masumi Dakemoto, Nagoya (JP); Akira Nakashima, Yokohama (JP); Masaru Hasegawa, Ichinomiya (JP)

(73) Assignees: TOYOTA JIDOSHA KABUSHIKI KAISHA, Toyota-shi (JP); Kabushiki Kaisha Toshiba, Tokyo (JP)

( * ) Notice: Subject to any disclaimer, the term of this patent is extended or adjusted under 35 U.S.C. 154(b) by 237 days.

(21) Appl. No.: 13/979,425

(22) PCT Filed: Dec. 21, 2011

(86) PCT No.: PCT/JP2011/080547
§ 371 (c)(1),
(2), (4) Date: Jul. 12, 2013

(87) PCT Pub. No.: WO2012/098821
PCT Pub. Date: Jul. 26, 2012

(65) Prior Publication Data
US 2013/0298136 A1 Nov. 7, 2013

(30) Foreign Application Priority Data
Jan. 18, 2011 (JP) ................................. 2011-007547

(51) Int. Cl.
G06F 9/46 (2006.01)
G06F 9/50 (2006.01)
G06F 9/52 (2006.01)

(52) U.S. Cl.
CPC ............... *G06F 9/50* (2013.01); *G06F 9/5011* (2013.01); *G06F 9/52* (2013.01); *G06F 9/526* (2013.01)

(58) Field of Classification Search
CPC ..................................................... G06F 9/5011
See application file for complete search history.

(56) References Cited

U.S. PATENT DOCUMENTS 5,940,828 A * 8/1999 Anaya et al. ......................... 1/1
2007/0168592 A1 7/2007 Todoroki et al.

FOREIGN PATENT DOCUMENTS

| JP | 63 146153 | 6/1988 |
|---|---|---|
| JP | 63 263557 | 10/1988 |
| JP | 07 105152 | 4/1995 |
| JP | 2001 166983 | 6/2001 |
| JP | 2003 085026 | 3/2003 |

(Continued)

OTHER PUBLICATIONS

Communication issued Sep. 17, 2014 in European Patent Application No. 11811172.3.

(Continued)

*Primary Examiner* — Camquy Truong
(74) *Attorney, Agent, or Firm* — Oblon, McClelland, Maier & Neustadt, L.L.P.

(57) ABSTRACT

A multiprocessor system includes plural processing parts configured to execute a program stored in a program memory; a common resource shared by the processing parts; a resource status table in which an occupation status of the common resource is written; a resource access table in which address areas are associated with occupation manners of the common resource on a function basis of the program stored in the program memory; and a controlling part configured to determine whether to permit execution of a function which involves occupation of the common resource by one of the processing parts using the resource status table and the resource access table.

13 Claims, 19 Drawing Sheets

(56) References Cited

FOREIGN PATENT DOCUMENTS

| | | |
|---|---|---|
| JP | 2007 141155 | 6/2007 |
| JP | 2007 188397 | 7/2007 |

OTHER PUBLICATIONS

Anonymous: "Introduction to Parallel Computing", Total pp. 27, (Oct. 11, 2004) XP002399731.

Hansen, B., Operating System Principles-Section 2.6-Program Construction, pp. 42-53, (Jan. 1, 1973), XP055058505.

International Search Report Issued May 4, 2012 in PCT/JP11/080547 Filed in Dec. 21, 2011.

Written Openion issued Apr. 22, 2013 in PCT/JP11/080547 Filed Dec. 21, 2011.

* cited by examiner

FIG.8

RESOURCE STATUS TABLE — 50

| FUNCTION ID | EXCLUSIVE SECTION | | RESOURCE ACCESS INFORMATION | | | SEMAPHORE REGISTER ID |
|---|---|---|---|---|---|---|
| | START ADDRESS | END ADDRESS | SHARED RAM | PERIPHERAL I/O | ...... | |
| | | | | | | |
| | | | | | | |

RESOURCE ACCESS TABLE — 40

| | EXCLUSIVE SECTION | | RESOURCE ACCESS INFORMATION | | |
|---|---|---|---|---|---|
| | START ADDRESS | END ADDRESS | SHARED RAM | PERIPHERAL I/O | ...... |
| FuncA | 0x1000 | 0x1100 | 1 | 0 | |
| FuncB | 0x2000 | 0x2200 | 1 | 1 | |

FIG.10

RESOURCE ACCESS TABLE 40

| | EXCLUSIVE SECTION | | RESOURCE ACCESS INFORMATION | | |
|---|---|---|---|---|---|
| | START ADDRESS | END ADDRESS | SHARED RAM | PERIPHERAL I/O | ...... |
| FuncA | 0x1000 | 0x1100 | 1 | 0 | |
| FuncB | 0x2000 | 0x2200 | 1 | 1 | |

RESOURCE STATUS TABLE 50

| FUNCTION ID | EXCLUSIVE SECTION | | RESOURCE ACCESS INFORMATION | | | SEMAPHORE REGISTER ID |
|---|---|---|---|---|---|---|
| | START ADDRESS | END ADDRESS | SHARED RAM | PERIPHERAL I/O | ...... | |
| FuncA | 0x1000 | 0x1100 | 1 | 0 | | 1 |

FIG.12

Resource Status Table (50):

| FUNCTION ID | EXCLUSIVE SECTION | | RESOURCE ACCESS INFORMATION | | | SEMAPHORE REGISTER ID |
|---|---|---|---|---|---|---|
| | START ADDRESS | END ADDRESS | SHARED RAM | SHARED RAM2 | ... | |
| | | | | | | |
| | | | | | | |

Resource Access Table (40):

| | EXCLUSIVE SECTION | | RESOURCE ACCESS INFORMATION | | |
|---|---|---|---|---|---|
| | START ADDRESS | END ADDRESS | SHARED RAM | SHARED RAM2 | ... |
| funcA | 0x1000 | 0x1100 | 1 | 0 | |
| funcB | 0x2000 | 0x2200 | 0 | 1 | |

MULTIPROCESSOR SYSTEM

TECHNICAL FIELD

The disclosures herein are related to a multiprocessor system which includes plural processing parts configured to execute a program stored in a program memory.

BACKGROUND ART

The multiprocessor system which includes plural processing parts has become widespread. For example, a multi-core processor in which plural processor cores (CPU cores) are incorporated into a single package and the processor cores perform processes independently, and a multiprocessor apparatus, which includes plural processors such as CPUs, etc., are known.

In general, the multiprocessor system includes a common resource to which the processing parts has access. For example, the common resource includes a RAM, an I/O device (I/O ports and a control device thereof), an A/D converter, etc. When the processing part accesses such a common resource, it is necessary to perform exclusive control for permitting the processing part to occupy (maintain) the access to the common resource for a certain period while preventing the accesses from other processing parts. The occupation right of the access is called as semaphore, etc.

Patent Document 1 discloses the multiprocessor system which performs the exclusive control and aims to prevent the generation of a deadlock. The deadlock occurs when the processes wait for the release of the resources which are occupied by one of the other processes and thus the processing stops. The multiprocessor system includes an exclusive control management table in which task names of a task which is currently under the exclusive control and a task which is currently in a status waiting for acquisition are stored on a common resource basis, and an exclusive control common resource information table in which names of the common resources which are currently being used under the exclusive control are stored. In this case, when a certain task issues a system call of a acquisition request of the common resource, it is determined in advance whether the deadlock would occur based on the contents of the exclusive control management table and the exclusive control common resource information table. If it is determined that the deadlock would occur if the acquisition request of the common resource were made as usual, the acquisition request of the common resource is not made.

Patent Document 2 discloses a multiprocessor system with a plurality of unit processors and includes an HW semaphore unit which sets a plurality of semaphores corresponding to a resource so as to be identifiable, and determines whether or not to request a semaphore being acquired by a second unit processor when a first unit processor makes the acquisition request for the semaphore to the HW semaphore unit, and a program control unit which places the request from the first unit processor in standby, if it is determined that the request requests the semaphore being acquired.

[Patent Document 1] Japanese Laid-open Patent Publication No. 7-105152

[Patent Document 2] Japanese Laid-open Patent Publication No. 2007-188397

Recently, in a field of an on-vehicle control apparatus installed on a vehicle, there may be a trend to integrate one control apparatus for controlling one on-vehicle device with another control apparatus for controlling another on-vehicle device (for example, integrate a control apparatus for a transmission with a control apparatus for an engine) to downsize computer hardware, thereby reducing cost and weight. The multiprocessor system with the processing parts is preferably used in order to integrate the hardware. In this case, the processing parts of the multiprocessor system execute the programs which were executed by the control apparatuses, respectively, and each of control apparatuses is implemented by a single processor.

In the single processor, as an ordinary configuration of source code, in order to maintain consistency of the resource (object to be accessed, such as a RAM, etc.), DI (Disable Interrupt) is executed during the access to the resource for writing of the data, etc. FIG. 1 is a diagram for illustrating a way of disabling the interrupt while a function A (indicated by FuncA in FIG. 1) in the single processor accesses the resource. In FIG. 1, variables X, Y and Z are parameters written in the RAM, for example. Further, PE stands for Processor Element which is an example of a CPU or other processing part.

Even if such processing is applied to the multiprocessor system directly, it is not possible to implement the exclusive control. This is because other PEs 2 and 3 can access the common resource even if the interrupt by the PE1 is disabled. FIG. 2 is a diagram for illustrating a situation in which the PEs 2 and 3 can access the common resource while the interrupt by the PE1 is disabled.

By nature, in order to perform the exclusive control for the common resource in the multiprocessor system, it should be designed at a system design stage in a software develop process. However, in practice, it is not easy to apply the design for the exclusive control to the complicated control software operated on the single processor.

Here, it may be easy to use a section between the DI (Disable Interrupt) and the EI (Enable Interrupt) directly as an occupation section of the common resource by the PE. However, in this case, a distinction of the common resource is not easy, and thus there may be a PE which is in the waiting status, even though its access request is not competing with others. FIG. 3 is a diagram for illustrating a situation in which the occupation of the common resource occurs between the DI and the EI of the PE1, and thus the function of the PE2 becomes in the waiting status. In the case of FIG. 3, since the function B accesses the variable Z which the function A does not access, the function B could have accessed the common resource by its nature concurrently with the access of the function A.

In this way, if the programs executed in the single processors are ported to the multiprocessor system, the modification of the programs due to the design of the exclusive control becomes complicated.

The multiprocessor systems such as disclosed in Patent Document 1, etc., do not consider such portability (i.e., assume the programs are designed specifically for the multiprocessor system) and thus do not have configurations suited for the porting from the single processors to the multiprocessor systems. Further, consequently, if the function is extended by adding a new program, etc., the modification of the program becomes complicated.

SUMMARY OF INVENTION

Therefore, an object of the present invention is to provide a multiprocessor system which eases the porting from the single processors to the multiprocessor system and the addition of the new program, etc.

In order to solve the aforementioned problems, according to the embodiment, a multiprocessor system is provided which includes plural processing parts configured to execute a program stored in a program memory; a common resource shared by the processing parts; a resource status table in which an occupation status of the common resource is written; a resource access table in which address areas are associated with occupation manners of the common resource on a function basis of the program stored in the program memory; and a controlling part configured to determine whether to permit execution of a function which involves occupation of the common resource by one of the processing parts using the resource status table and the resource access table.

BRIEF DESCRIPTION OF DRAWINGS

FIG. 8 is a diagram for illustrating a status of a resource status table 50 and a relevant part of a resource access table 40 when a competition determination is made for a shared RAM.

FIG. 10 is a diagram for illustrating a status of a resource status table 50 and a relevant part of a resource access table 40 when a competition determination is made for a shared RAM.

FIG. 12 is a diagram for illustrating a status of a resource status table 50 and a relevant part of a resource access table 40 when a competition determination is made for a shared RAM.

BEST MODE FOR CARRYING OUT THE INVENTION

In the following, a mode for carrying out the present invention will be described by referring to embodiments with reference to the accompanying drawings.

Embodiment

In the following, a multiprocessor system 1 according to an embodiment of the present invention will be described with reference to the accompanying drawings.

[Configuration]

Figure 1:
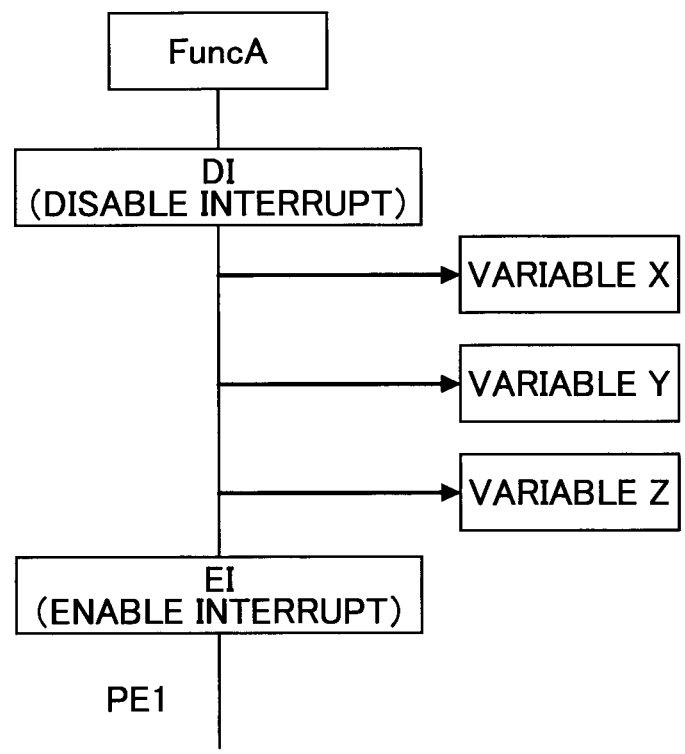
FIG. 1 is a diagram for illustrating a way of disabling the interrupt while a function A in a single processor accesses to the resource.
Figure 2:
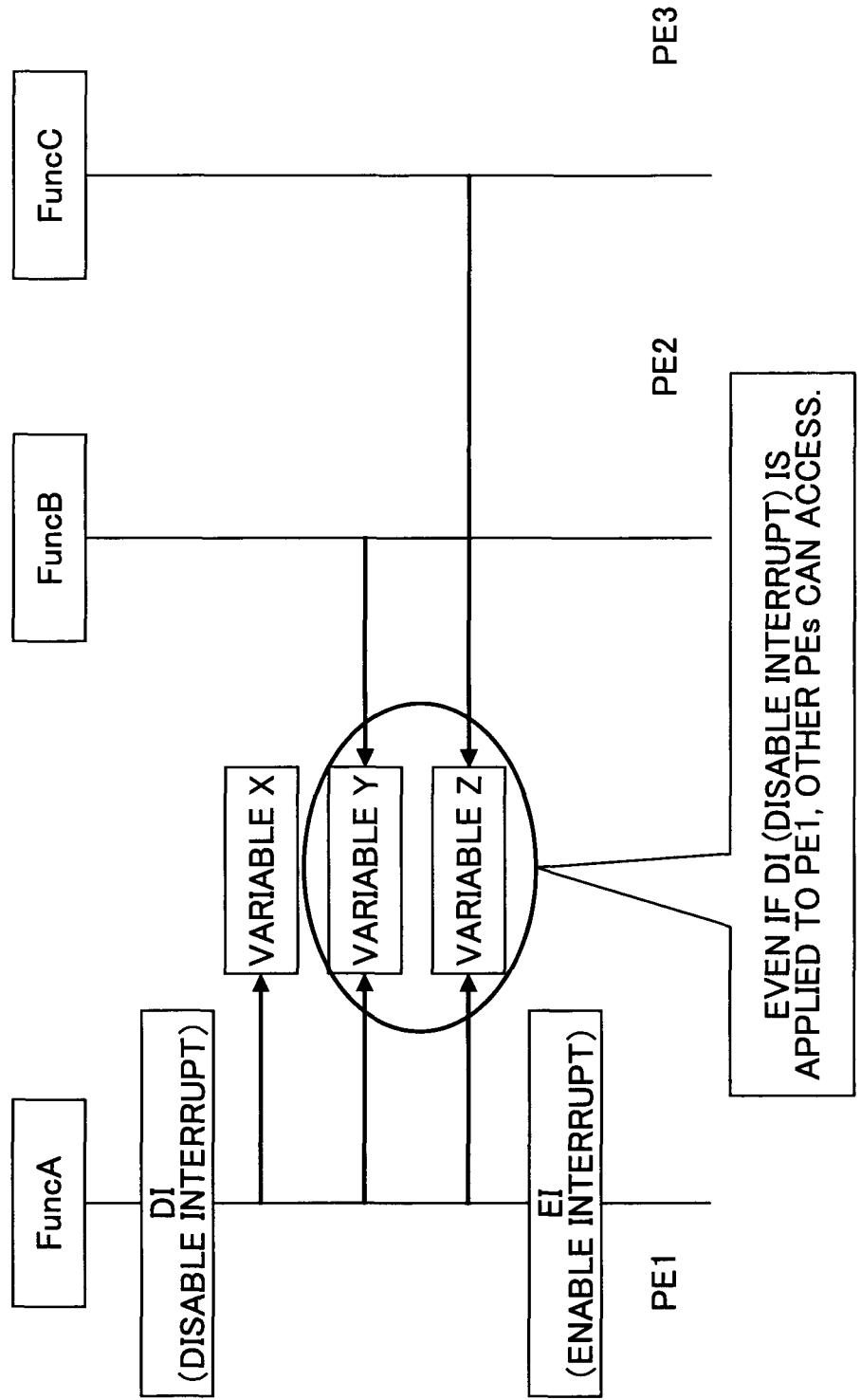
FIG. 2 is a diagram for illustrating a situation in which PEs 2 and 3 can access a common resource while the interrupt by a PE1 is disabled.
Figure 3:
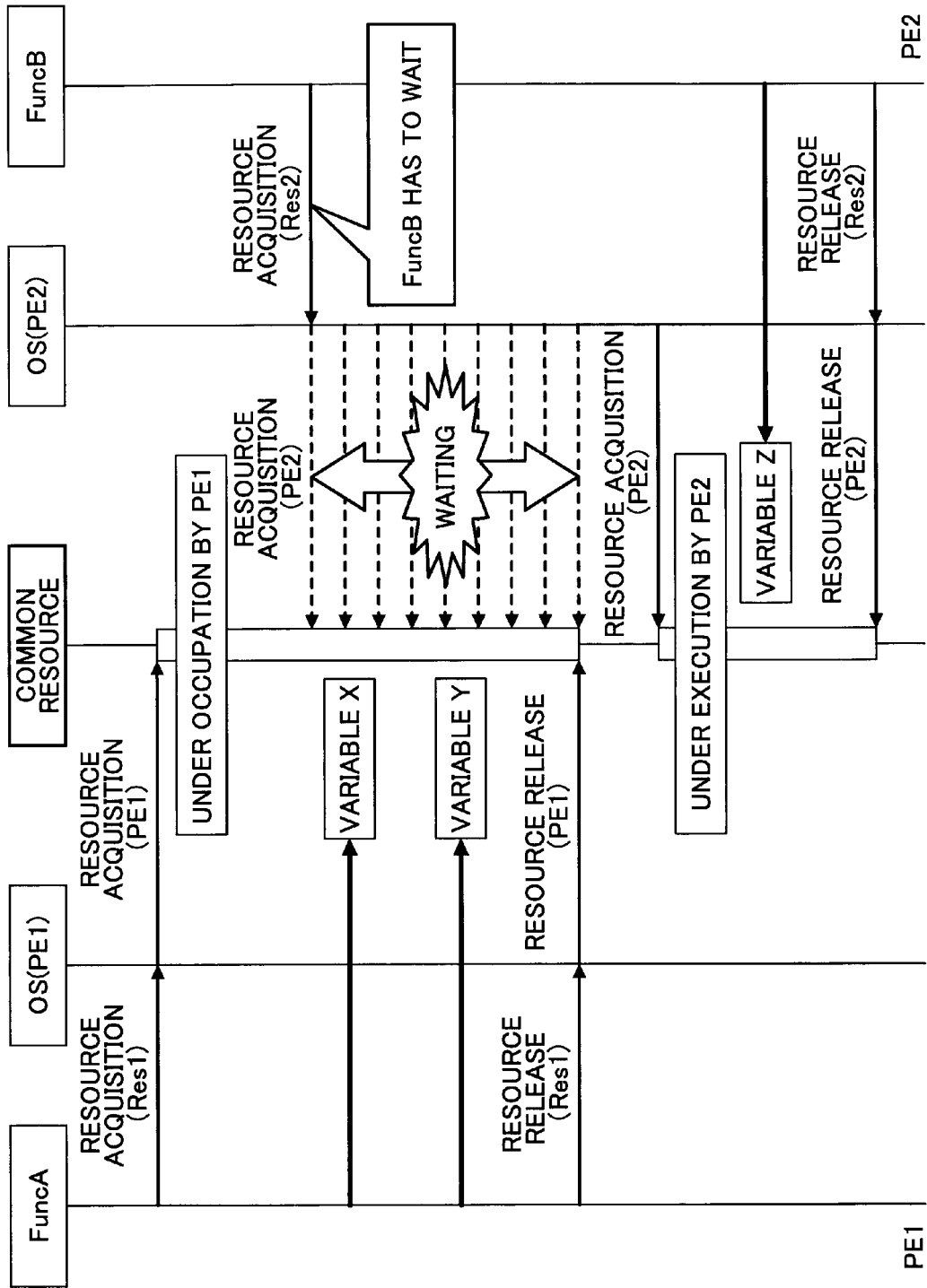
FIG. 3 is a diagram for illustrating a situation in which the occupation of the common resource occurs between DI and EI of the PE1, and thus the function of the PE2 becomes in the waiting status.
Figure 4:
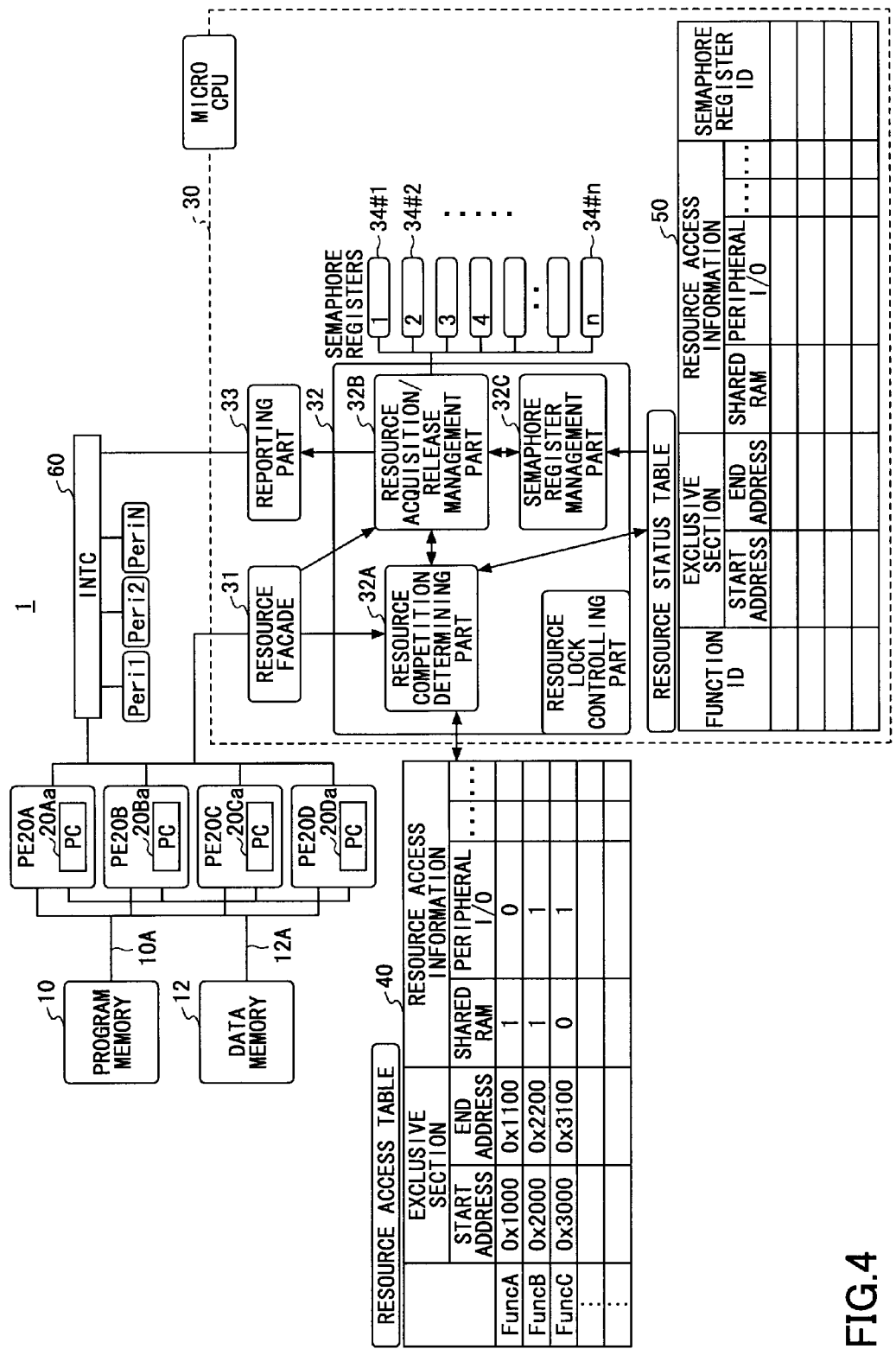
FIG. 4 is a diagram for illustrating an example of a configuration of a multiprocessor system 1 according to an embodiment of the present invention.

FIG. 4 is a diagram for illustrating an example of a configuration of a multiprocessor system 1 according to an embodiment of the present invention. The multiprocessor system 1 includes, as main components, a program memory 10, a data memory 12, PEs (Processor Elements) 20A, 20B, 20C and 20D, a micro CPU 30, a resource access table 40, a resource status table 50, and an INTC (Interrupt controller) 60. In the following, the PEs are collectively indicated as "respective PEs", etc., as necessary.

The program memory 10 is a ROM (Read Only Memory), a flash ROM, an EEPROM (Electrically Erasable and Programmable Read Only Memory), etc. The program memory 10 stores instructions to be executed by the PEs on a function basis. The program memory 10 is coupled to the respective PEs via an instruction bus 10A.

The data memory 12 is a RAM (Random Access Memory), for example. The data memory 12 stores calculation results of the PEs, etc. The data memory 12 is coupled to the respective PEs via a data bus 12A.

The PEs are microcomputers which include instruction fetch units, instruction buffers, instruction decoders, computing elements, LSUs (Load Store Unit), internal registers, etc., in addition to program counters (abbreviated as "PC" in the drawing) 20Aa, 20Ba, 20Ca and 20Da. The PEs fetche and decode instructions stored at addresses in the program memory 10 indicated by the corresponding program counter, and perform four operations of arithmetic, etc. The results of the four operations of arithmetic are stored in the internal register, and are output to be stored in the data memory 12, if necessary. The instructions stored in the data memory 12 can be referred to by the PEs. Thus, the PEs can perform their own processes while sharing information. Further, the values indicated by the program counters 20Aa, 20Ba, 20Ca and 20Da can be referred to by the micro CPU 30.

The micro CPU 30 includes, as its internal functions, a resource facade 31, a resource lock controlling part 32, a reporting part 33, and semaphore registers 34#1 through 34#n. The resource lock controlling part 32 includes a resource competition determining part 32A, a resource acquisition/release management part 32B, and a semaphore register management part 32C. The semaphore registers 34#1 through 34#n are provided such that they are associated with the common resource(s) in the multiprocessor system 1.

The resource facade 31 receives resource acquisition requests and resource release requests input from the PEs.

The resource competition determining part 32A determines the competition for a subject resource (a common resource for which the resource acquisition request is made) using the values of the program counters 20Aa, 20Ba, 20Ca and 20Da, the resource access table 40 and the resource status table 50, and outputs the determination result to the resource acquisition/release management part 32B.

If the determination result of the resource competition determining part 32A indicates that there is the competition, the resource acquisition/release management part 32B registers the resource acquisition requests input from the PEs in a queue (not illustrated). The queue may be associated with the semaphore registers 34#1 through 34#n, or may be set in an independent register, etc. On the other hand, if the determination result of the resource competition determining part 32A indicates that there is no competition, the resource acquisition/release management part 32B registers the PE, which outputs the resource acquisition request, in the corresponding one of the semaphore registers 34#1 through 34#n which is associated to the subject resource, and reports the subject resource to the reporting part 33.

Further, when the resource release request is input from the PE, the resource acquisition/release management part 32B searches the queue. Then, if there is a resource acquisition request registered, the resource acquisition/release management part 32B reserves the subject resource for the PE which outputs the resource acquisition request. Specifically, as is the case described above, the resource acquisition/release management part 32B registers the PE, which outputs the resource acquisition request, in the corresponding one of the semaphore registers 34#1 through 34#n which is associated with the subject resource, and reports the subject resource to the reporting part 33. On the other hand, if there is no resource acquisition request registered in the queue, the resource acquisition/release management part 32B releases the corresponding semaphore register.

The semaphore register management part 32C performs a rewriting operation, etc., of the semaphore registers 34#1 through 34#n according to instructions from the resource acquisition/release management part 32B.

At the time of a common resource being reserved, the reporting part 33 reports to the PE, which outputs the resource acquisition request, that the common resource is reserved. Such a notification of information is performed as an interrupt notification via the INTC 60. The PE, which receives the notification that the common resource is reserved, starts to access to the corresponding common resource.

[Process of Competition Determination, Etc., by Micro CPU 30]

Next, a competition determination of the subject resource using the resource access table 40 and the resource status table 50 and processes related thereto are described.

The resource access table 40 is fixed data stored in the program memory 10 or another ROM (including a flash ROM or an EEPROM), for example. The resource access table 40 associates address areas of the functions of the program in the program memory with occupation manners of the common resource on a function basis. As illustrated in FIG. 4, the resource access table 40 defines exclusive sections including start addresses and end addresses, and resource access information representing a type of the common resource such as a shared RAM, a peripheral I/O, etc. With the resource access table 40, it is possible to determine which common resource is to be occupied when the respective instructions (functions) on the program memory 10 are executed. It is noted that in practice the resource access table 40 may be the data loaded from the ROM to the RAM, the flash memory, the register, etc.

The resource status table 50 is the data which is stored in the RAM, the flash memory, the register, etc., in the micro CPU 30 and rewritten as necessary, and represents an occupation status of the common resource at that time. As illustrated in FIG. 4, in the resource status table 50 an exclusive section; resource access information representing a type of the common resource such as a shared RAM, a peripheral I/O, etc.; a semaphore register ID associated with the common resource which is occupied by the function; etc., are written on a function ID basis. The function ID represents the function which is being executed at that time and involves the occupation of the common resource.

Figure 5:
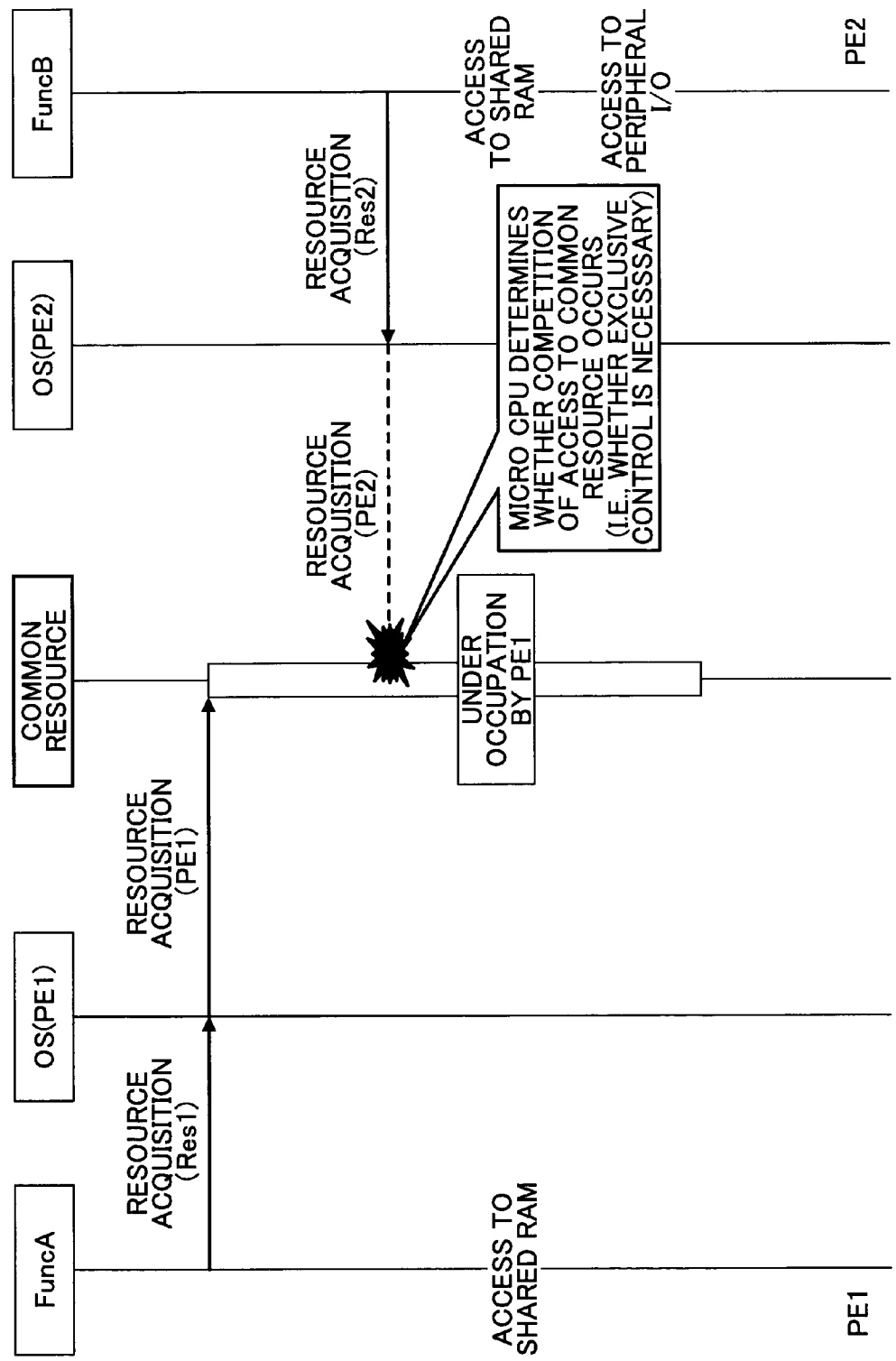
FIG. 5 is a diagram for schematically illustrating a situation in which a resource competition determining part 32A determines whether competition for access to the common resource occurs.

When the resource acquisition requests are input from the respective PEs, at first, the resource competition determining part 32A acquires the values of the program counters of the corresponding PEs. Then, the resource competition determining part 32A searches the resource access table 40 using the value of the program counter to identify the subject resource. Then, the resource competition determining part 32A refers to the resource status table 50 to perform the competition determination based on whether the identified subject resource is under the occupation (in use) by another PE. FIG. 5 is a diagram for schematically illustrating a situation in which the resource competition determining part 32A determines whether competition for the access to the common resource occurs.

Figure 6:
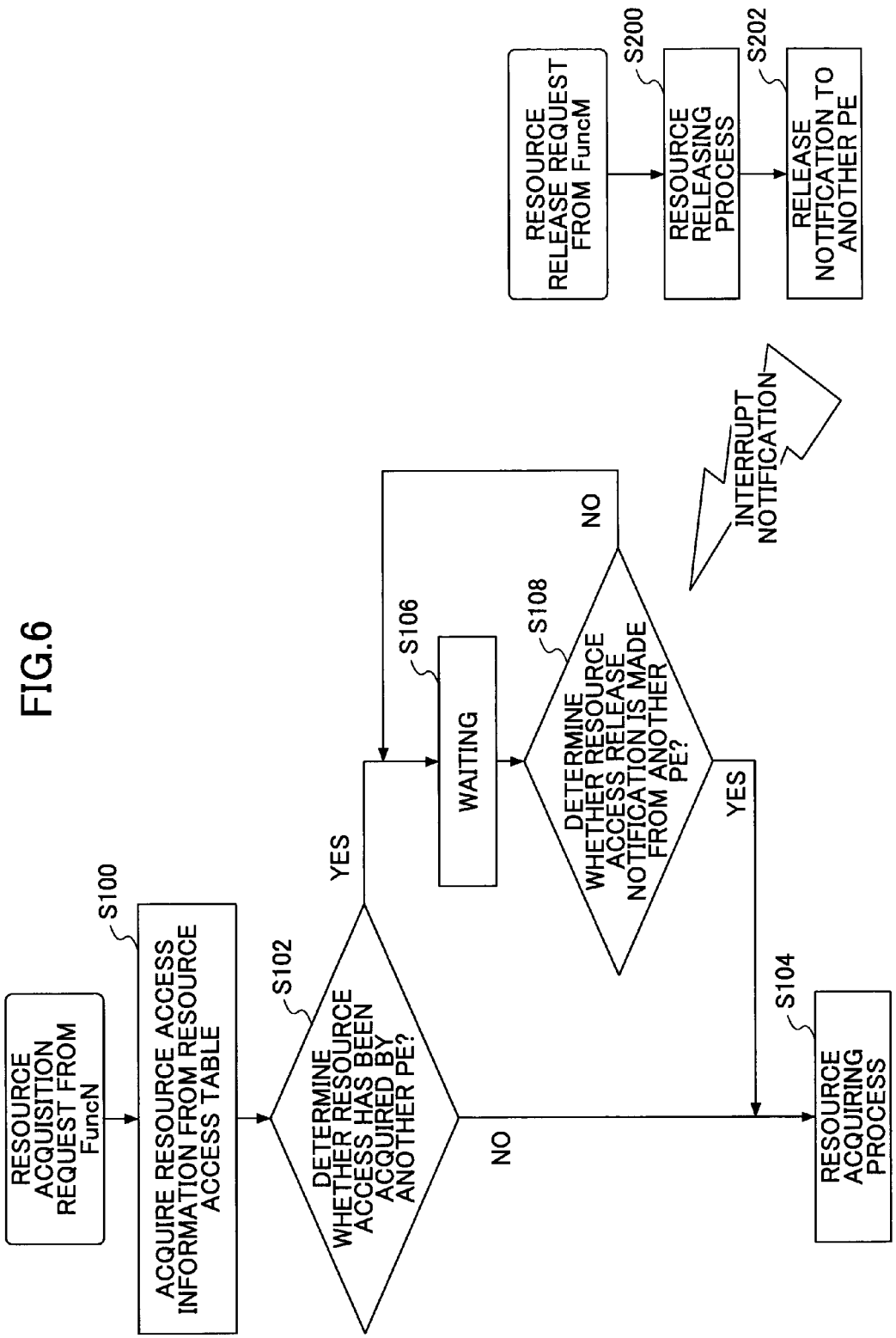
FIG. 6 is a flowchart of a process executed by a micro CPU 30.

FIG. 6 is a flowchart of a process executed by the micro CPU 30.

At first, when the resource acquisition request is made by the function N, the micro CPU 30 acquires the resource access information from the resource access table 40 (S100). Then, the micro CPU determines whether the corresponding common resource is occupied by another PE (S102). If it is determined that the corresponding common resource is not occupied by another PE, the micro CPU 30 performs a process for the acquisition of an access right to the common resource by the function N.

On the other hand, if it is determined that the corresponding common resource is occupied by another PE, the micro CPU 30 keeps the function N in a waiting status until there is a release notification from the other PE.

The release notification is performed via steps of a resource release process (S200) and a release notification process (S202) when a function M which another PE executes outputs the resource release request.

Figure 7:
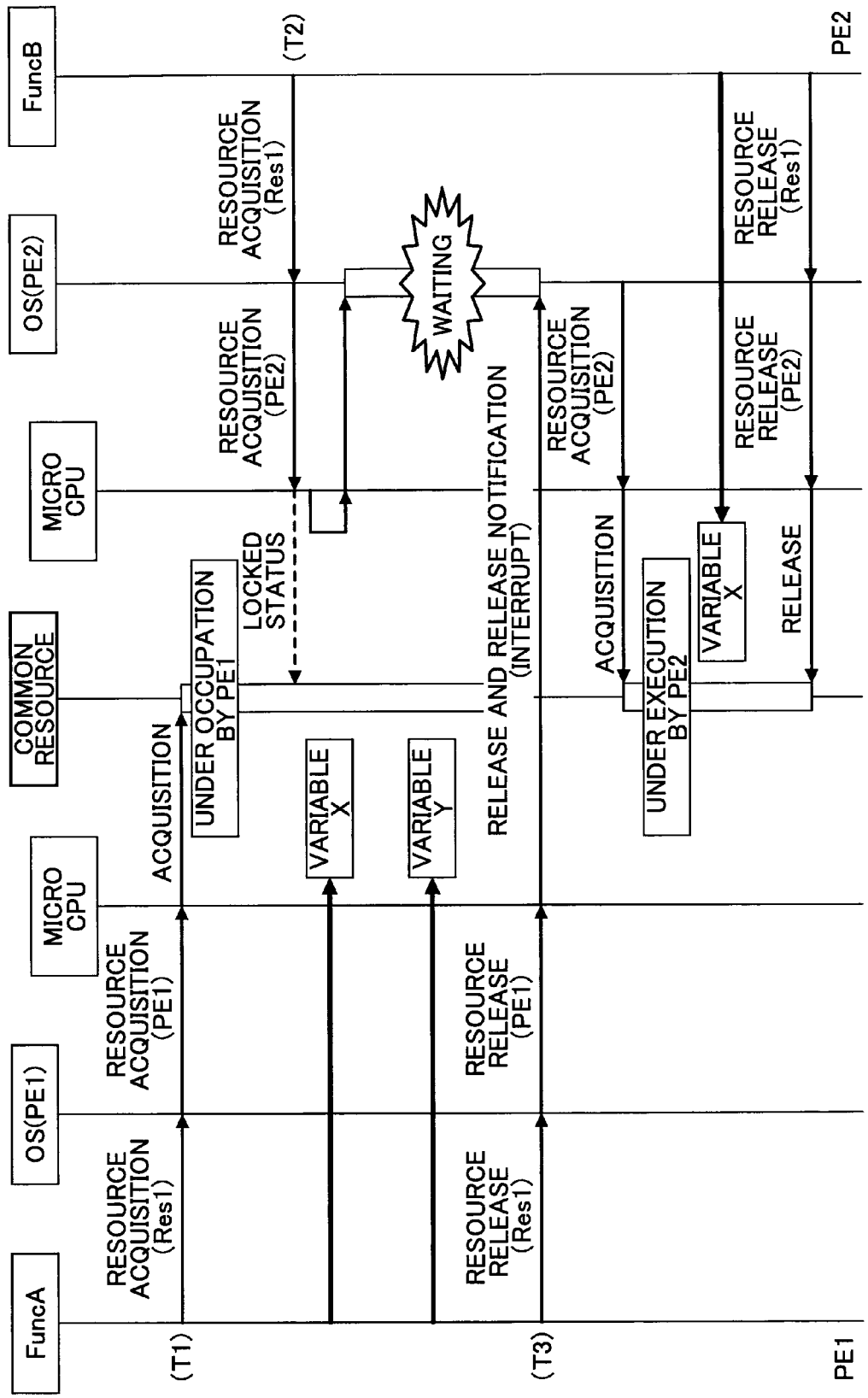
FIG. 7 is a sequence diagram for illustrating a situation in which the access competition occurs when a function A of a PE 20A and a function B of a PE 20B try to access to the same common resource.

In the following, the above process is described in detail. FIG. 7 is a sequence diagram for illustrating a situation in which the access competition occurs when a function A of a PE 20A and a function B of a PE 20B try to access to the same common resource.

Figure 9:
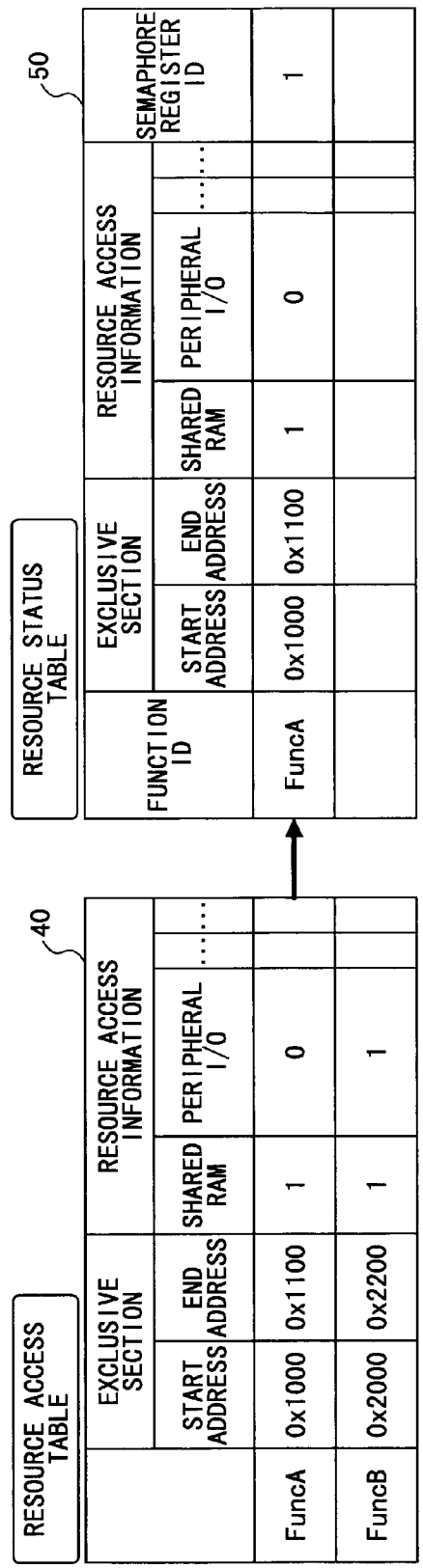
FIG. 9 is a diagram for illustrating a situation in which information about the function A is copied to the resource status table 50.

In FIG. 7, at the time T1 when the resource acquisition request is input from the PE 20A, the micro CPU 30 acquires the value of the program counter of the PE 20A to identify the subject resource, as described above. Then, the micro CPU 30 refers to the resource status table 50 to perform the competition determination based on whether the identified subject resource is under occupation by another PE. In the illustrated example, the resource acquisition request for the shared RAM is made, and the shared RAM is not registered in the resource status table 50. Thus, the function A is permitted to occupy the shared RAM. FIG. 8 is a diagram for illustrating a status of the resource status table 50 and a relevant part of the resource access table 40 when a competition determination is made for the shared RAM. In the illustrated case, information about the function A is copied to the resource status table 50, and the function A is registered in a corresponding one of the semaphore registers 34#1 through 34#n which is associated with the shared RAM. FIG. 9 is a diagram for illustrating a situation in which the information about the function A is copied to the resource status table 50.

In FIG. 7, at the time T2 when the resource acquisition request is input from the PE20B, the micro CPU 30 acquires the value of the program counter of the PE 20B to identify the subject resource. In the illustrated example, the resource acquisition request for the shared RAM and the peripheral I/O is made, and the shared RAM is registered in the resource status table 50 (i.e., in a locked status). Thus, the function B is not permitted to occupy the shared RAM and the peripheral I/O. FIG. 10 is a diagram for illustrating a status of the resource status table 50 and a relevant part of the resource access table 40 when a competition determination is made for the shared RAM.

In FIG. 7, at the time T3 when the resource release request is input from the function A, the micro CPU 30 deletes the function A from the corresponding one of the semaphore registers 34#1 through 34#n which is associated with the shared RAM to release the semaphore register. Then, a release notification Interrupt for the PE 20B is issued by the reporting part 33. As a result of this, the PE 20B outputs the resource acquisition request again.

Figure 11:
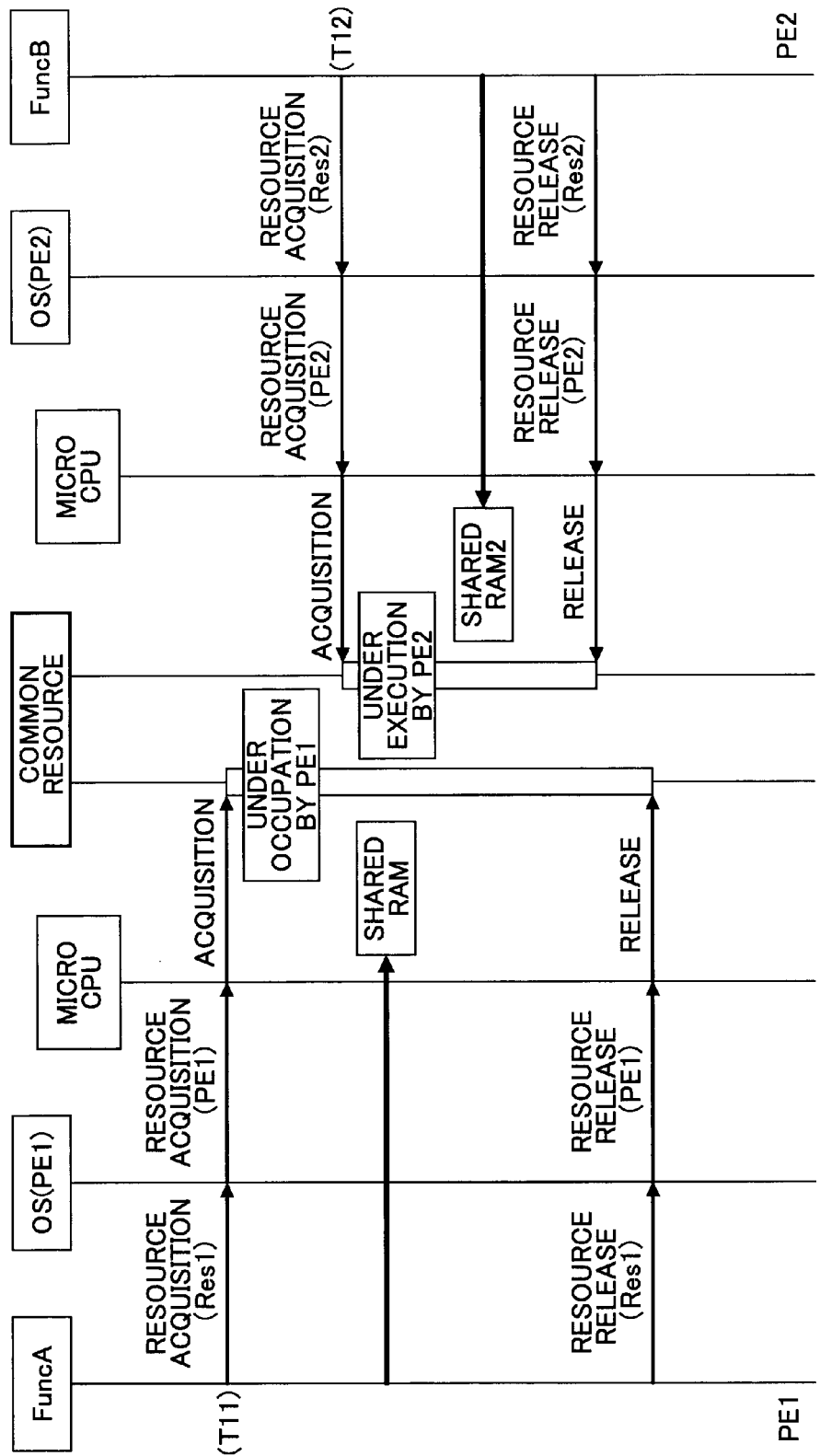
FIG. 11 is a sequence diagram for illustrating a situation in which the access competition does not occur when a function A of a PE 20A and a function B of a PE 20B try to access different common resources.

FIG. 11 is a sequence diagram for illustrating a situation in which the access competition does not occur when a function A of a PE 20A and a function B of a PE 20B try to access different common resources.

Figure 13:
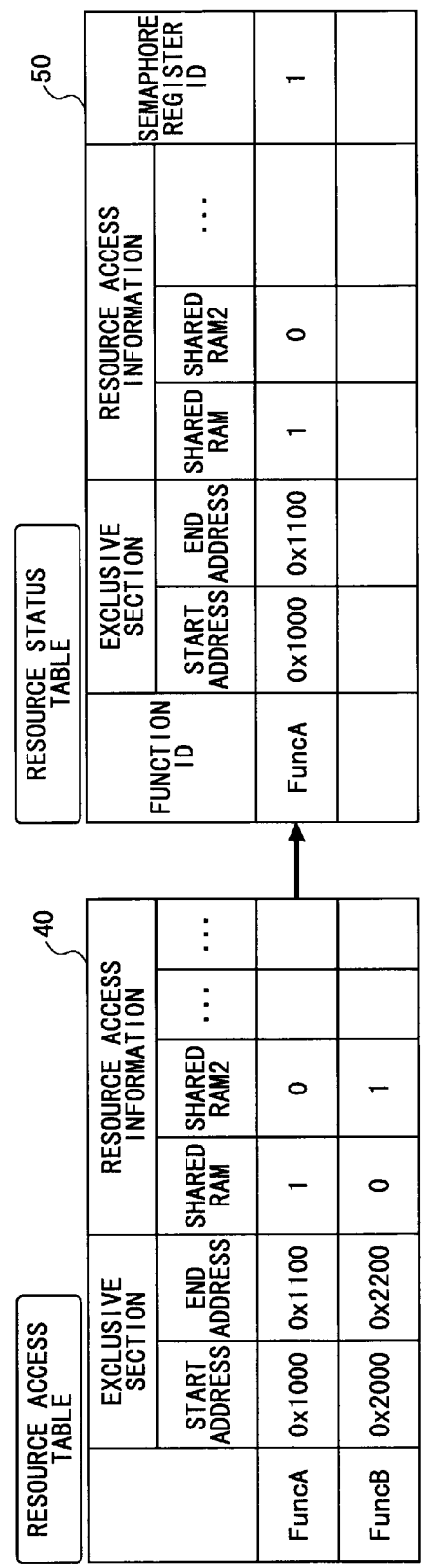
FIG. 13 is a diagram for illustrating a situation in which information about the function A is copied to the resource status table 50.

In FIG. 11, at the time T11 when the resource acquisition request is input from the PE20A, the micro CPU 30 acquires the value of the program counter of the PE 20A to identify the subject resource, as described above. Then, the micro CPU 30 refers to the resource status table 50 to perform the competition determination based on whether the identified subject resource is under the occupation by another PE. In the illustrated example, the resource acquisition request for the shared RAM is made, and the shared RAM is not registered in the resource status table 50. Thus, the function A is permitted to occupy the shared RAM. FIG. 12 is a diagram for illustrating a status of the resource status table 50 and a relevant part of the resource access table 40 when a competition determination is made for the shared RAM. In the illustrated case, information about the function A is copied to the resource status table 50, and the function A is registered in a corresponding one of the semaphore registers 34#1 through 34#n which is associated with the shared RAM. FIG. 13 is a diagram for illustrating a situation in which the information about the function A is copied to the resource status table 50.

Figure 14:
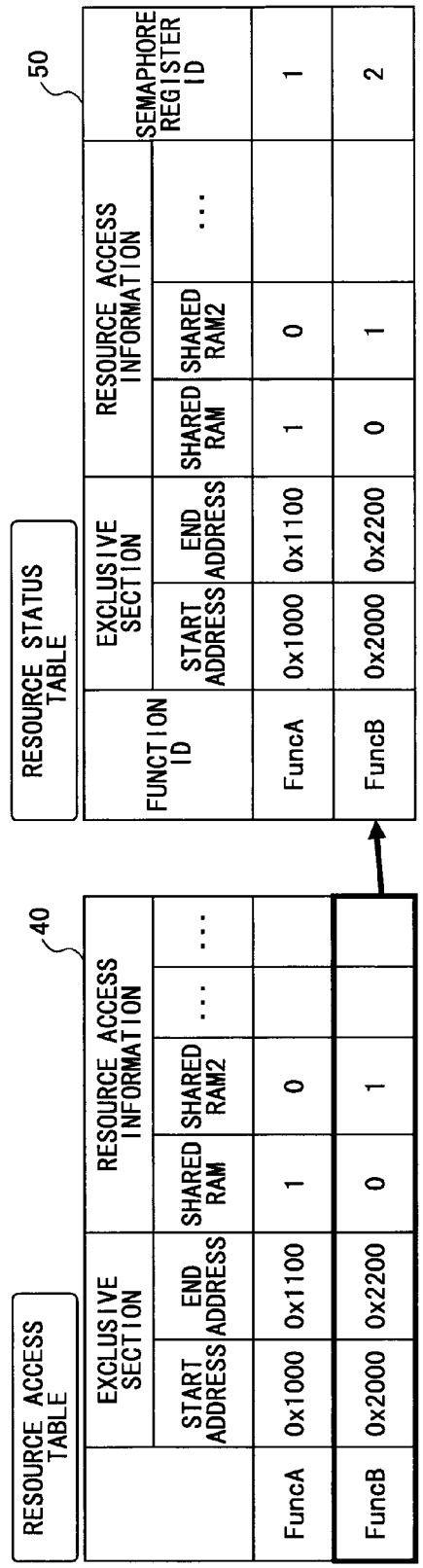
FIG. 14 is a diagram for illustrating a status of a resource status table 50 and a relevant part of a resource access table 40 when a competition determination is made for a shared RAM.

In FIG. 11, at the time T12 when the resource acquisition request is input from the PE20B, the micro CPU 30 acquires the value of the program counter of the PE 20B to identify the subject resource. In the illustrated example, the resource acquisition request for a shared RAM 2 is made, and the shared RAM 2 is not registered in the resource status table 50 (i.e., not in a locked status). Thus, the function B is permitted to occupy the shared RAM 2. FIG. 14 is a diagram for illustrating a status of the resource status table 50 and a relevant part of the resource access table 40 when a competition determination is made for the shared RAM.

After that, when the resource release request is input from the function B, the micro CPU 30 deletes the function B from the corresponding one of the semaphore registers 34#1 through 34#n which is associated with the shared RAM 2 to release the semaphore register. Further, when the resource release request is input from the function A, the micro CPU 30 deletes the function A from the corresponding one of the semaphore registers 34#1 through 34#n which is associated with the shared RAM to release the semaphore register.

[Construction of Multiprocessor System]

Figure 15:
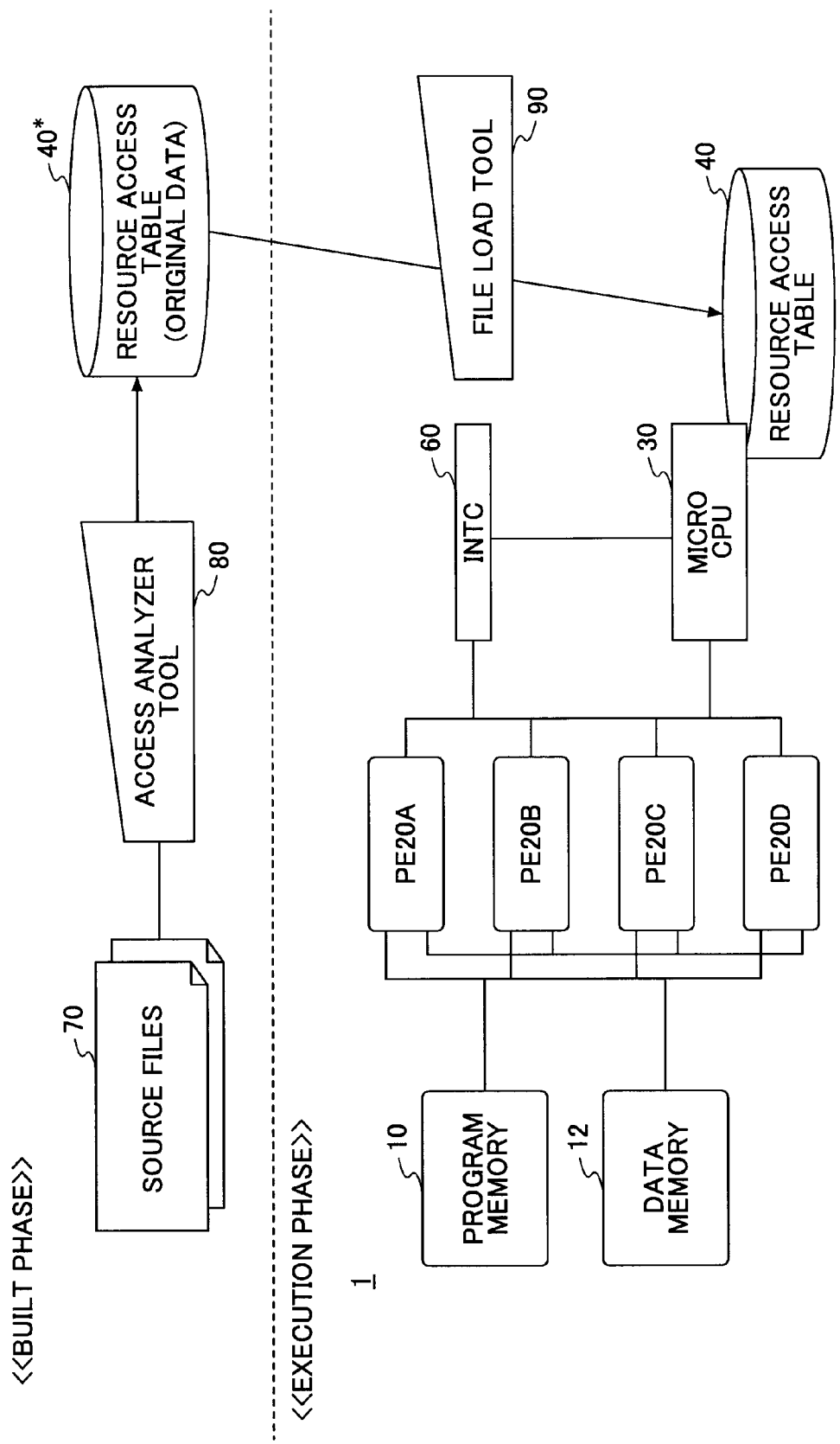
FIG. 15 is a diagram for schematically illustrating a process in which the resource access table 40 is installed in a multiprocessor 1.

FIG. 15 is a diagram for schematically illustrating a process in which the resource access table 40 is installed in a multiprocessor 1. The resource access table 40 is installed in the multiprocessor 1 by processing, with an access analyzer tool 80, source files 70 of the programs originally executed by the single processors to generate original data 40* for the resource access table 40 (built phase), and by writing the original data 40* in the ROM, etc., with a file load tool 90 (execution phase).

Figure 16:
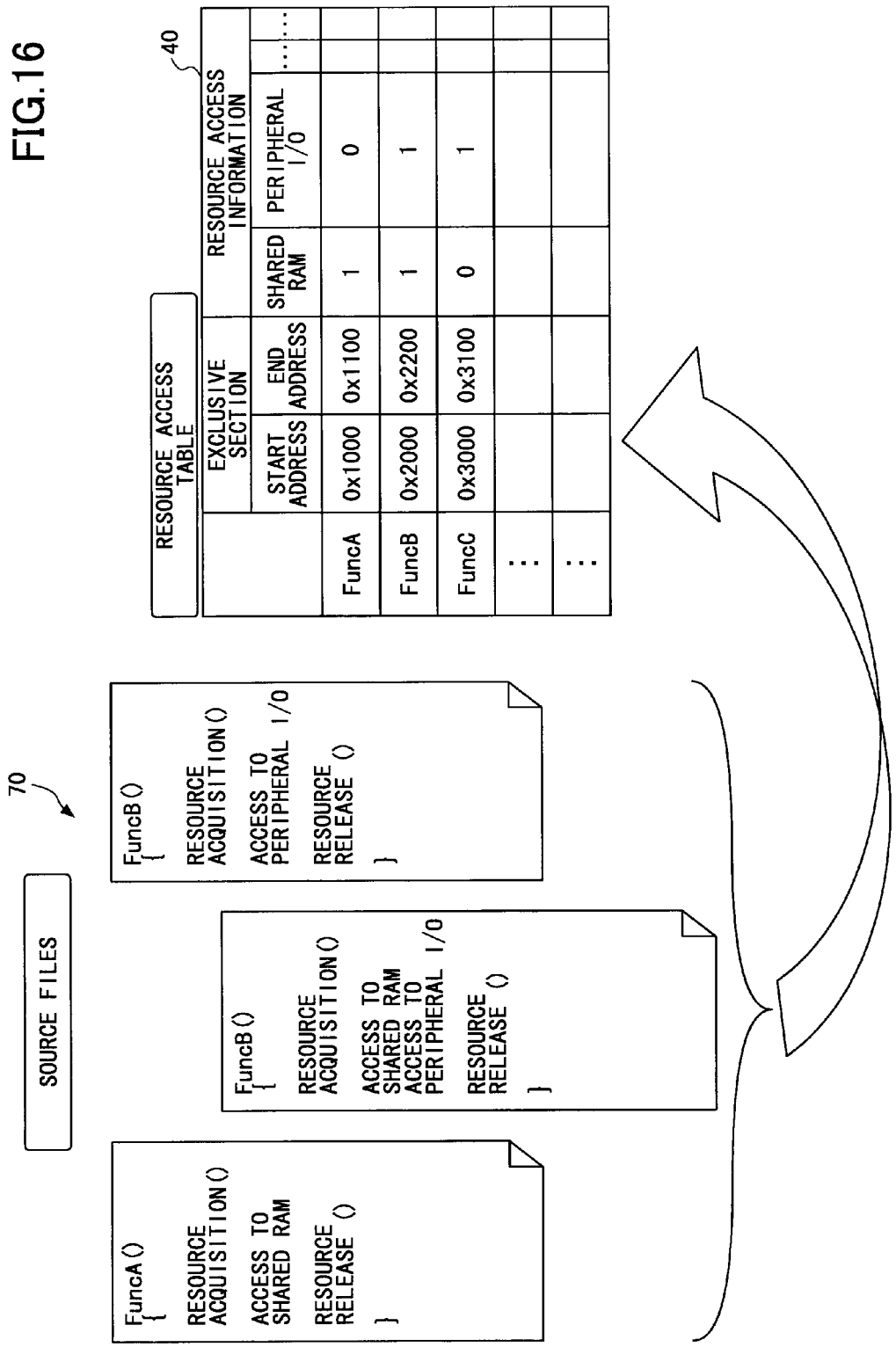
FIG. 16 is a diagram for schematically illustrating a situation in which the resource access table 40 is generated from source files 70.

FIG. 16 is a diagram for schematically illustrating a situation in which the resource access table 40 is generated from the source files 70. As illustrated in FIG. 16, in the source files 70, for example, a definition of the function, a resource acquisition instruction, designation of the common resource, and a resource release instruction are described successively. The access analyzer tool 80 generates the resource access table 40 by adding the address in the program memory 10 to this. It is noted that preferably an address range of the function corresponds to a section between DI (Disable Interrupt) and EI (Enable Interrupt) in the case of a single processor performing the function.

[Unit of Common Resource in Table]

A unit (granularity) of the common resource in the resource access table 40 and the resource status table 60 may be set between a component unit and the whole common resource according to a size of the system and required performance.

Figure 17:
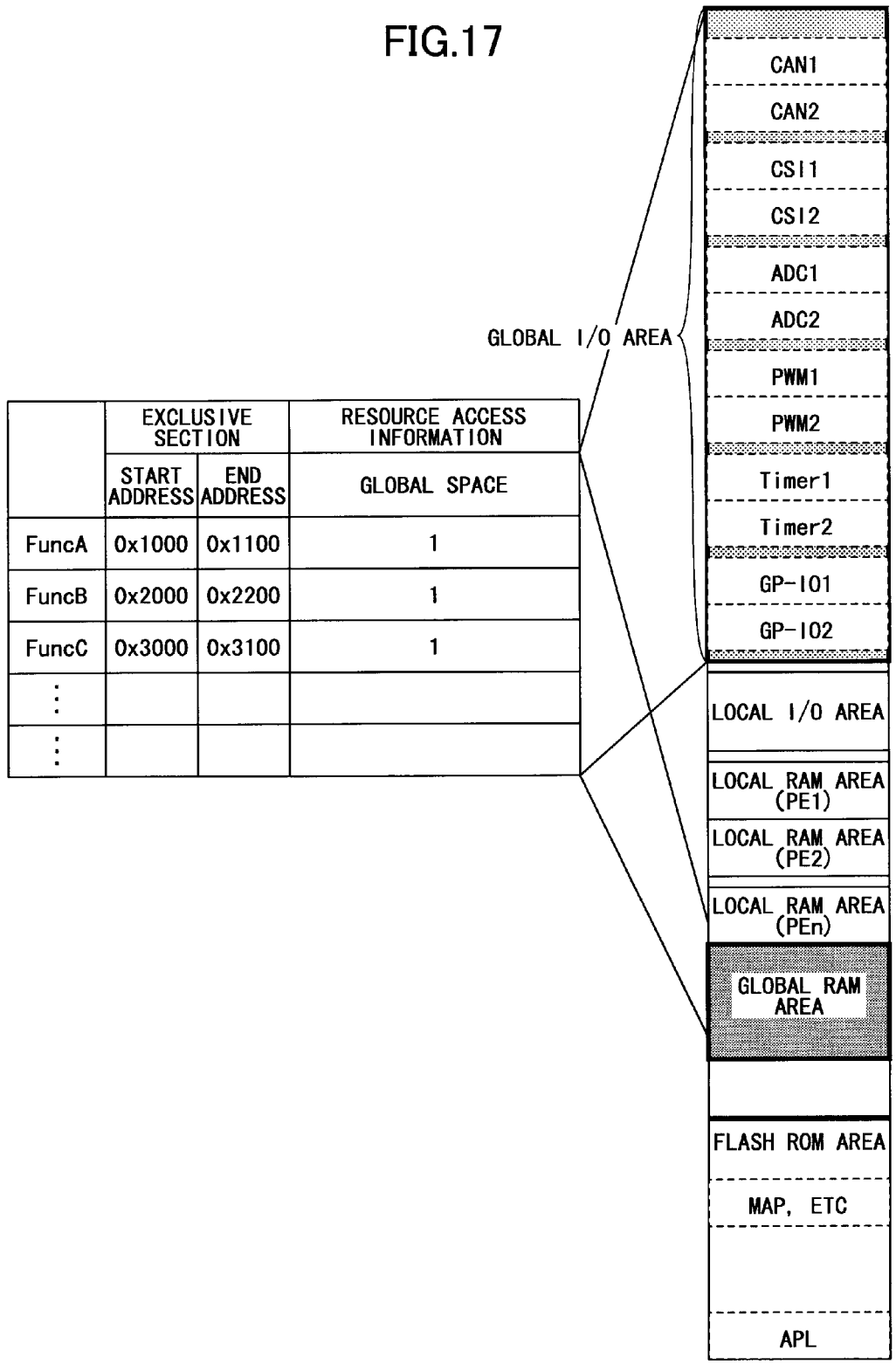
FIG. 17 is a diagram for illustrating a setting of the resource access table 40 and the resource status table 50 in the case of treating the overall common resources as a common resource.

FIG. 17 is a diagram for illustrating a setting of the resource access table 40 and the resource status table 50 in the case of treating the overall common resources (indicated by "Global space" in the drawing) as a common resource. In this case, the resource access table 40 and the resource status table 50 include a Global I/O region (ports and control thereof), such as a CAN (Controller Area Network), a CSI, an ADC (Analog Digital Controller), PWM (Pulse Width Modulation), and a Global RAM region. In this case, it is possible to reduce an area in the ROM which is occupied by the resource access table 40 and an area in the RAM, etc., when the resource access table 40 is loaded to the RAM, etc.; however, the possibility of the access competition becomes high and the process speed may decrease.

Figure 18:
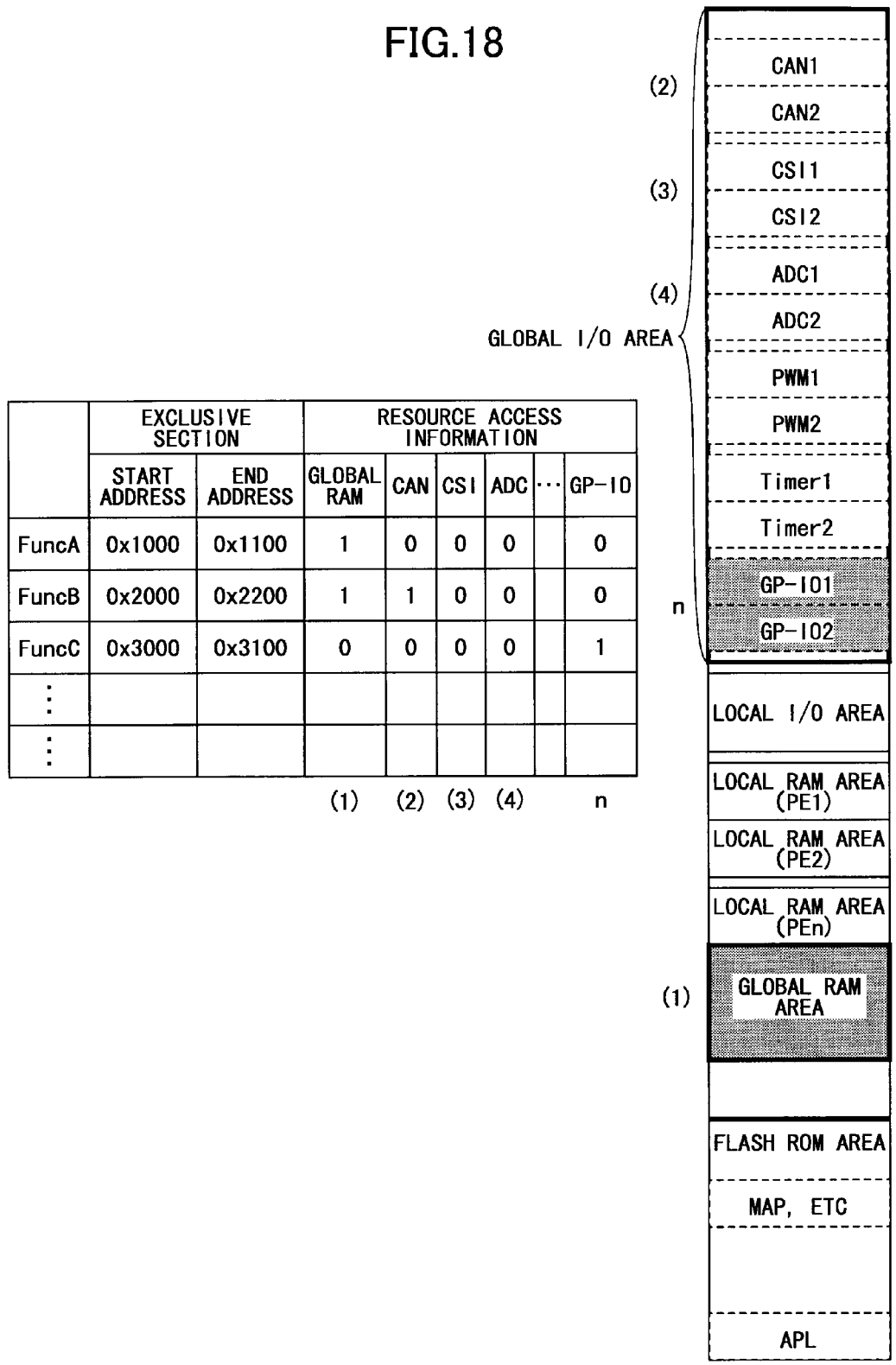
FIG. 18 is a diagram for illustrating the setting in the case where a unit of the common resource in the resource access table 40 and the resource status table 50 is smaller than that of FIG. 17.

FIG. 18 is a diagram for illustrating the setting in the case where a unit of the common resource in the resource access table 40 and the resource status table 50 is smaller than that of FIG. 17. In this case, an area in the ROM which is occupied by the resource access table 40 and an area in the RAM, etc., when the resource access table 40 is loaded to the RAM, etc., become larger; however, there is the possibility of the access competition becoming low and the process speed may be improved.

Figure 19:
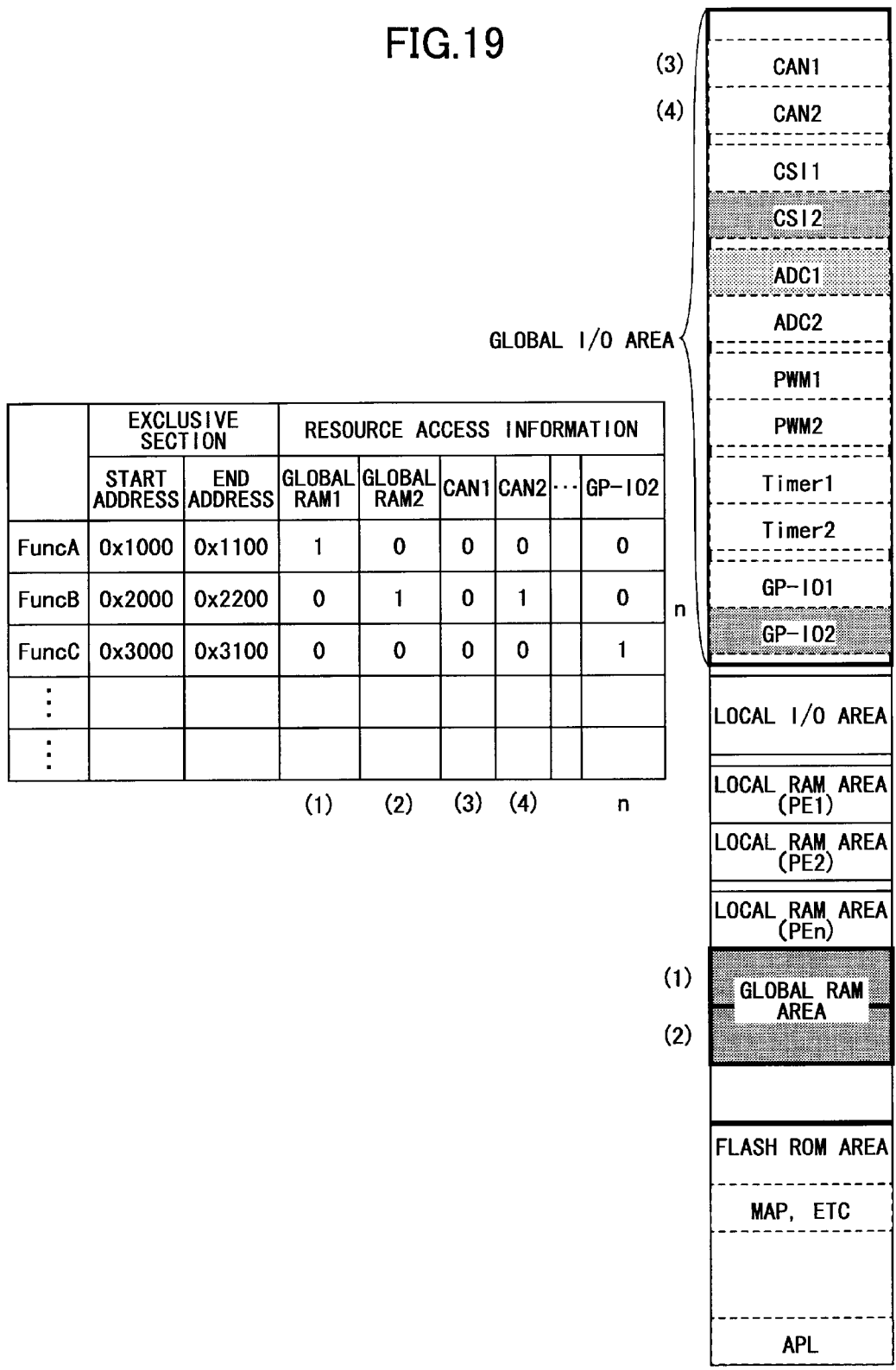
FIG. 19 is a diagram for illustrating the setting in the case where the unit of the common resource in the resource access table 40 and the resource status table 50 is smaller than that of FIG. 18.

FIG. 19 is a diagram for illustrating the setting in the case where the unit of the common resource in the resource access table 40 and the resource status table 50 is smaller than that of FIG. 18. In the illustrated example, the common resource with plural terminals is divided and treated as if it were plural common resources. In this case, an area in the ROM which is occupied by the resource access table 40 and an area in the RAM, etc., when the resource access table 40 is loaded into the RAM, etc., become much larger; however, the possibility exists that the access competition becomes much lower and the process speed may be improved.

[Advantage]

According to the multiprocessor system 1 of the embodiment, it becomes easier to perform the porting from the single processors to the multiprocessor system and add the new programs, etc.

Further, since the multiprocessor system 1 includes the resource lock controlling part 32 which determines whether to permit execution of a function which involves occupation of the common resource by the PE using the resource status table 50 and the resource access table 40, the PEs need not include, in the resource acquisition request, information which indicates the requested common resource (i.e., subject resource). Therefore, it is possible to reduce a communication load and a size of the program.

The present invention is disclosed with reference to the preferred embodiments. However, it should be understood that the present invention is not limited to the above-described embodiments, and variations and modifications may be made without departing from the scope of the present invention.

The present application is based on Japanese Priority Application No. 2011-007547, filed on Jan. 18, 2011, the entire contents of which are hereby incorporated by reference.

The invention claimed is:

1. A multiprocessor system, comprising:
   plural processing parts comprising first processing circuitry configured to execute a program stored in a program memory, the program including a plurality of functions;
   common hardware resources shared by the plural processing parts;
   a resource status table comprising first data stored in at least one processing part of the plurality of processing parts, in which an occupation status of the common hardware resources is written;
   a resource access table comprising second data including address areas in which, on a function basis of the program stored in the program memory, an address area of a function of the plurality of functions is associated with one or more of the common hardware resources to be occupied when the function of the plurality of functions is executed;
   a controller comprising second processing circuitry configured to determine, using the resource status table and the resource access table, whether to permit execution, by one of the plural processing parts, of a function of the plurality of functions that would occupy one or more of the common hardware resources; and
   a plurality of program counters, each of which is associated with a corresponding processing part of the plural processing parts,
   wherein the controller is further configured to:
      compare a value of a program counter of the plurality of program counters with the address areas in the resource access table, and determine which one or more of the common hardware resources are occupied by the function of the plurality of functions,
      compare the determined one or more of the common hardware resources with the occupation status indicated in the resource status table, and
      permit execution, by the one of the plural processing parts, of the function of the plurality of functions that would occupy the one or more of the common hardware resources if the occupation status indicates that the one or more of the common hardware resources are not occupied by said function.

2. The multiprocessor system as claimed in claim 1, wherein when a resource acquisition request is made by the one of the plural processing parts, the controller is further configured to use a value of the program counter of the plurality program counters, which is associated with the one of the plural processing parts that made the resource acquisition request, to compare the value with the address areas in the resource access table.

3. The multiprocessor system as claimed in claim 1, wherein if the controller determines not to permit the execution, by the one of the plural processing parts, of the function that would occupy the one or more of the common hardware resources, the controller is further configured to perform queuing of the function whose execution is not permitted.

4. The multiprocessor system as claimed in claim 1, wherein the common hardware resources include a shared random access memory (RAM) and a peripheral input/output (I/O).

5. The multiprocessor system as claimed in claim 1, wherein the common hardware resources include a first shared random access memory (RAM) and a second shared RAM.

6. The multiprocessor system as claimed in claim 1, wherein a unit of the common hardware resources defined in the resource status table and the resource access table corresponds to a component unit of the common hardware resources set according to at least one of a size and required performance of the multiprocessor system.

7. The multiprocessor system as claimed in claim 1, wherein the address areas defined in the resource access table correspond to a section between DI (Disable Interrupt) and EI (Enable Interrupt) in a case of a single processing part of the plural processing parts comprising the first processing circuitry performing the function of the plurality of functions.

8. The multiprocessor system as claimed in claim 1, wherein, when a resource acquisition request is made by one of the plural processing parts, the controller is further configured to determine whether to permit the execution, by the one of the plural processing parts, of the function of the plurality of functions that would occupy the one or more of the common hardware resources.

9. The multiprocessor system as claimed in claim 8, wherein the resource acquisition request does not include information that directly indicates the one or more common hardware resources to which an access is required.

10. The multiprocessor system as claimed in claim 1, wherein when a resource release request is from a function whose execution has been completed, the controller is further configured to update the resource status table to release the one or more common hardware resources occupied by the function whose execution has been completed to another function of the plurality of functions.

11. The multiprocessor system as claimed in claim 1, wherein, when the controller permits the execution, by the one of the plural processing parts, of the function of the plurality of functions that would occupy the one or more of the common hardware resources, the controller is further configured to update the resource status table to lock the one or more common hardware resources against occupation by another function of the plurality of functions.

12. The multiprocessor system as claimed in claim 1, wherein the plural processing parts comprising the first processing circuitry are processor cores, and the multiprocessor system includes at least one multi-core processor.

13. The multiprocessor system as claimed in claim 1, wherein,
when a resource acquisition request is made by the one of the plural processing parts, the controller is further configured to
refer to the resource access table to determine which one or more of the common hardware resources are occupied by the function of the plurality of functions executed by the one of the plural processing parts, and then
refer to the resource status table to determine whether the one or more of the common hardware resources to be occupied is currently occupied by another function of the plurality of functions; and
when the one or more of the common hardware resources is not currently occupied by the another function of the plurality of functions, the controller is further configured to
reserve the one or more of the common hardware resources to be occupied by the function of the plurality of functions executed by the one of the plural processing parts that made the resource acquisition request,
permit the execution of said function by the one of the plural processing parts, and
update the resource status table to lock the one or more common hardware resources against occupation by another function of the plurality of functions.

* * * * *